United States Patent
Vyas

(10) Patent No.: US 12,386,589 B2
(45) Date of Patent: Aug. 12, 2025

(54) HBase ONLINE MERGING

(71) Applicant: RAKUTEN SYMPHONY, INC., Tokyo (JP)

(72) Inventor: Aniruddh Vyas, Indore, IN (US)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/005,969

(22) PCT Filed: Nov. 15, 2022

(86) PCT No.: PCT/US2022/049913
§ 371 (c)(1),
(2) Date: Jan. 19, 2023

(87) PCT Pub. No.: WO2024/107176
PCT Pub. Date: May 23, 2024

(65) Prior Publication Data
US 2024/0248680 A1    Jul. 25, 2024

(51) Int. Cl.
| | |
|---|---|
| *G06F 7/14* | (2006.01) |
| *G06F 9/48* | (2006.01) |
| *G06F 16/21* | (2019.01) |
| *G06F 16/958* | (2019.01) |

(52) U.S. Cl.
CPC .............. *G06F 7/14* (2013.01); *G06F 9/485* (2013.01); *G06F 16/217* (2019.01); *G06F 16/986* (2019.01)

(58) Field of Classification Search
CPC ........ G06F 7/14; G06F 16/217; G06F 16/986; G06F 9/485
See application file for complete search history.

(56) References Cited

U.S. PATENT DOCUMENTS

| | | | |
|---|---|---|---|
| 2005/0198070 A1* | 9/2005 | Lowry | G06F 16/316 |
| 2011/0258225 A1* | 10/2011 | Taylor | G06F 16/2272 |
| | | | 707/769 |
| 2013/0282668 A1* | 10/2013 | Hsieh | G06F 16/215 |
| | | | 707/691 |
| 2016/0275094 A1* | 9/2016 | Lipcon | G06F 16/278 |
| 2017/0060937 A1* | 3/2017 | Joshi | G06F 16/2455 |
| 2019/0007206 A1* | 1/2019 | Surla | H04L 63/10 |
| 2020/0394163 A1* | 12/2020 | Wang | G06F 16/215 |
| 2021/0034618 A1 | 2/2021 | Lu et al. | |

FOREIGN PATENT DOCUMENTS

| | | |
|---|---|---|
| CN | 114022148 A | 2/2022 |
| CN | 114022148 B | 4/2022 |

* cited by examiner

*Primary Examiner* — Courtney Harmon
(74) *Attorney, Agent, or Firm* — HAUPTMAN HAM, LLP

(57) ABSTRACT

An online merging method is used to remove zero-byte regions in an HBase database. The cluster of the HBase database is checked to ensure the cluster is in standby mode or is online and paused. Regions in the cluster that are zero-byte regions and that are adjacent are identified as candidates for an online merge operation. Adjacent zero-byte regions include a first region having an end key value equal to a start key value of a subsequent region. A script is created for performing the online merge operation on the regions in the cluster. The script is run on the regions until there are no more zero-byte regions in the cluster. Jobs on the cluster of the HBase database are resumed after performing the online merging operations.

20 Claims, 7 Drawing Sheets

| Name 510 | Region Server 534 | Read Reqs. 536 | Write Reqs. 538 | Store File Size 540 | No. Store Files 542 | Memory Store Size 544 | Locality 546 | Start Key 526 | End Key 528 |
|---|---|---|---|---|---|---|---|---|---|
| Alarm History, 123456.ax123by978. 552 | hdp-worker-node—001 554 | 0 556 | 8,010 558 | 4 MB | 1 | 0B | 1.0 | | 123456789 |
| Alarm History, 234567.bx456cy654. 570 | hdp-worker-node—002 572 | 0 | 0 | 0 560 | 0 562 | 0B 564 | 0.0 | 123456789 576 | 123457999 |
| Alarm History, 345678.cx567dy543. 580 | hdp-worker-node—003 582 | 0 | 0 | 0 | 0 | 0B 574 | 0.0 | 123457999 586 | 123459999 578 |
| Alarm History, 456789.dx678ey432. 590 | hdp-worker-node—004 | 0 | 0 | 0 | 0 | 0B 584 | 0.0 | 123459999 596 | 123462456 588 |
| Alarm History, 567890.fx678gy321. | hdp-worker-node—005 592 | 0 | 0 | 0 | 0 | 0B 594 | 0.0 | 123462456 | 123474699 598 |

FIG. 5

HBase ONLINE MERGING

RELATED APPLICATIONS

The present application is a National Phase of International Application No. PCT/US2022/049913, filed Nov. 15, 2022.

TECHNICAL FIELD

Embodiments described herein provide an online merging process to remove zero-byte regions in an HBase database.

BACKGROUND

Hadoop is an open-source software utilities that facilitates using a network of many computers to solve problems involving massive amounts of data and computation. Hadoop provides a software framework for distributed storage and processing of big data. There are many components of Hadoop including HBase. HBase is a column-oriented non-relational database management system that runs on top of Hadoop Distributed File System (HDFS). HBase provides a distributed, scalable, big data store and provides fault-tolerant storing of sparse data sets. Sparse data sets are common in many big data use cases. HBase is well suited for real-time data processing or random read/write access to large volumes of data.

HBase stores a lot of data in tables in the form of regions. In a cluster, there are nodes or machines that function as a slave in a master slave architecture. At least one node acts as a master and the remainder of nodes are slaves or worker nodes. Once a region gets to a certain limit, that region is automatically split into two regions. For example, the split point used for splitting a region is the row key that corresponds to the mid-point in the block index for the largest store file in the largest store.

Region splits are also able to be manually managed. HBase load distribution is able to be monitored. In response to determining that some regions are getting uneven loads, those regions are able to be manually split to even-out the load and improve throughput.

In response to regions being split into a number of regions on a cluster that exceed a threshold, the pressure on the cluster when reading and writing operations or when performing compaction operations on the table increases. Merging regions reduces the number of regions and is a method to attempt to optimize performance. However, regions are not monitored 24-7 and a region is able to split at any time. A user is able to determine that a manual intervention involving a merge operation is desirable, but, unlike region splitting, HBase does not provide usable tools for online merging or merging regions automatically.

SUMMARY

In at least embodiment, a method for performing online merging of regions in an HBase database includes presenting, in a user interface (UI) presented on a display, regions in a cluster of an HBase database, identifying regions in the cluster that are candidate regions for performing the online merging operation, creating a script for performing the online merging operation on the candidate regions in the cluster, and running the script on the candidate regions in the cluster to perform the online merging operation.

In at least one embodiment, a device for performing online merging includes a memory storing computer-readable instructions, and a processor connected to the memory, wherein the processor is configured to execute the computer-readable instructions to present, in a user interface (UI) presented on a display, regions in a cluster of an HBase database, identify regions in the cluster that are candidate regions for performing the online merging operation, create a script for performing the online merging operation on the candidate regions in the cluster, and run the script on the candidate regions in the cluster to perform the online merging operation.

In at least one embodiment, a non-transitory computer-readable media having computer-readable instructions stored thereon, which when executed by a processor causes the processor to perform operations including includes presenting, in a user interface (UI) presented on a display, regions in a cluster of an HBase database, identifying regions in the cluster that are candidate regions for performing the online merging operation, creating a script for performing the online merging operation on the candidate regions in the cluster, and running the script on the candidate regions in the cluster to perform the online merging operation.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 5 illustrates Regions List User Interface (UI) according to at least one embodiment.

DETAILED DESCRIPTION

Figure 1:
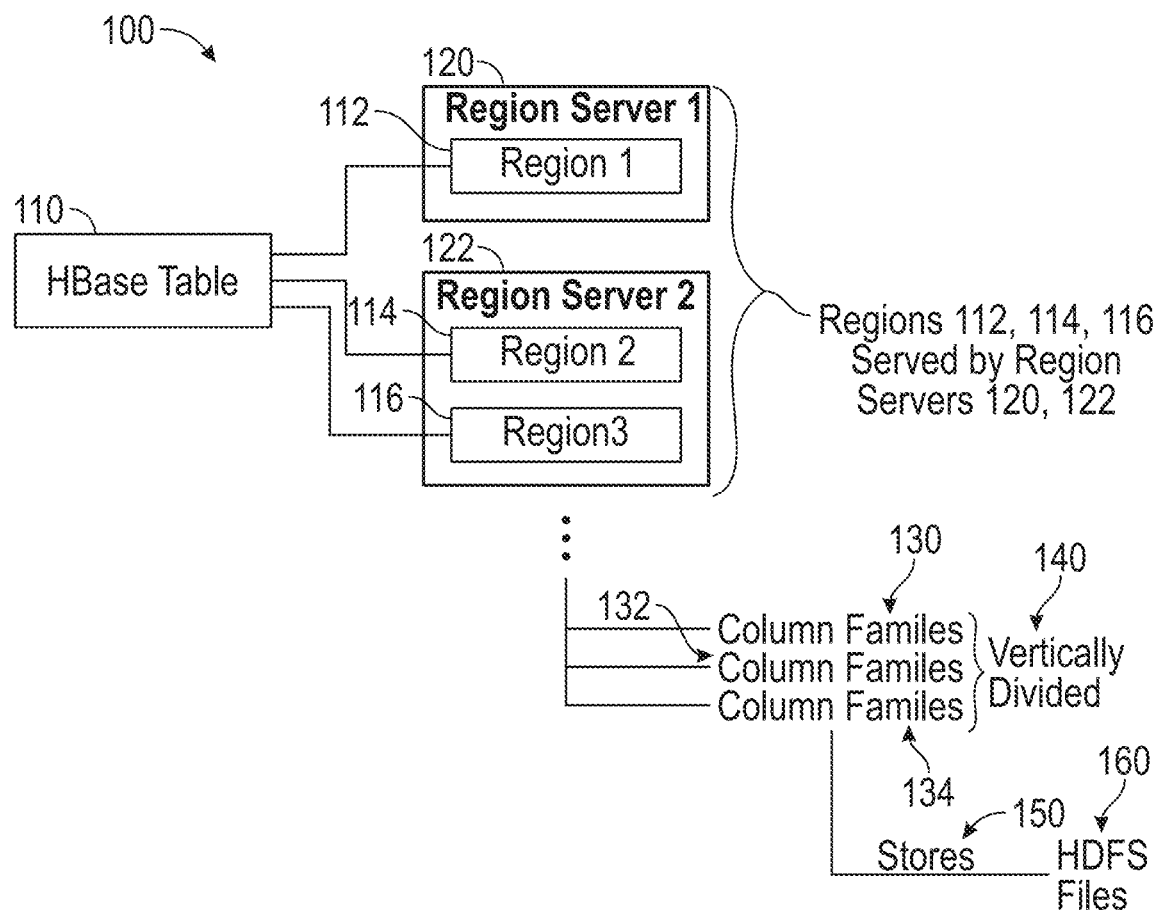
FIG. 1 illustrates an HBase architecture according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or a data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or a data-stream or signaling-stream from UE.

In at least one embodiment, an online merging method is used to remove zero-byte regions in an HBase database. Zero-byte regions include all column having values of 0, and are also referred to as empty regions. HBase is a column-oriented non-relational database management system that runs on top of Hadoop Distributed File System (HDFS). The cluster of the HBase database is checked to ensure regions in the cluster that are to be merged are in an idle state, e.g., standby mode or is online and paused. The idle state refers to regions in the cluster that are to be merged having no jobs (applications) running, i.e., no processing or read/write is being executed on the HBase tables/regions during the merge operation. Accordingly, selected target tables for the merge are stopped, and the other tables/regions function as usual. So, the HBase service remains online and read/writes are able to be performed on the tables that are not subject to the merge. Regions in the cluster that are zero-byte regions and that are adjacent are identified as candidates for an online merge operation. Adjacent zero-byte regions include a first region having an end key value equal to a start key value of a subsequent region. A script is created for performing the online merge operation on the regions in the cluster. The script is run on the regions until there are no more zero-byte regions in the cluster. Jobs on the cluster of the HBase database are resumed after performing the online merging operations.

Embodiments described herein provide method that provides one or more advantages. For example, online merging and automatic merging of regions is provided. Small regions are able to be merged automatically. Online merging according to at least one embodiment is faster than manual methods and results in the user having to supply less manual input. An entire cluster is considered in one scripted process. Regions are able to be analyzed to find pairs to be merged, offline those regions, and merge them rather than disabling HBase. In response to there being extra regions or too many regions and performance is able to be improved by execution of a merge, the merge processes is performed.

FIG. 1 illustrates an HBase architecture 100 according to at least one embodiment.

In FIG. 1, an HBase table 110 stores data in Regions 112, 114, 116. One or more of Regions 112, 114, 116 are stored on Region Servers 120 122. HBase architecture 100 is different from relational database schemas. HBase architecture 100 is much simpler and provides some advantages over Relational Database Management Systems (RDBMS). RDBMS have been around since the early 1970s, and have helped companies and organizations to implement solutions to many problems. There are many use cases for which RDBMS is appropriate. Yet there also seem to be specific problems that do not fit the RDBMS model very well. For example, RDBMS cannot manage structured, unstructured, and sparse data. RDBMS also involves scaling issues when the amount of data begins to increase quickly. HBase architecture 100 overcomes these disadvantages.

HBase architecture 100 is a column-oriented non-relational database management system that runs on top of Hadoop Distributed File System (HDFS). Hadoop excels at storing data of arbitrary, semi-, or even unstructured formats because Hadoop provides flexibility on how to interpret the data at analysis time. The flexibility allows the user to change the way the data is classified at any time based on configurable algorithms.

Column-oriented data of HBase architecture 100 involves the grouping of data by columns, where subsequent column values are stored contiguously on disk. In comparison, traditional databases use row-oriented approaches, which store entire rows contiguously. Reduced I/O is one of the primary advantages of HBase architecture 100, but additional advantages are also evident. For example, the values of one column are often much better suited for compression than the heterogeneous values of a row-oriented record structure because most compression algorithms look at a finite window.

The basic unit of scalability and load balancing in HBase architecture is a Region 112, 114, 116. Regions are contiguous ranges of rows stored together. Regions are dynamically split by the system when the regions become too large. Alternatively, regions may also be merged offline to reduce the number of regions and the number of storage files. Regions 112, 114, 116 are spread across Region Servers 120, 122, thus distributing the load, and therefore providing scalability. Column Families 130, 132, 134 vertically divide 140 Regions 112, 114, 116. Column Families 130, 132, 134 are logical and physical groupings of columns. A column family, e.g., Column Family 130, is referred to as a Store 150. The columns in Column Family 130 are stored separately from columns in Column Families 132, 134.

Stores 150 are saved as Hadoop Distributed File System (HDFS) files 160. HDFS files 160 provide high throughput access to application data and are suitable for applications that have large data sets. HDFS files 160 are designed to enable streaming access to file system data.

Initially there is one region for a table, and as data is added, the system is monitored to ensure a configured maximum size is not exceeded. In response to exceeding the configured maximum size, a region, e.g., Region 112, is able to be split into two separate regions at the middle key, i.e., the row key in the middle of the region. Splitting a region creates two halves. Regions 112, 114, 116 are served by one or more Region Servers 120, 122. Region Servers 120, 122 are able to serve many regions at any time.

Sometimes, performance improvements are able to be provided by margining regions, e.g., Regions 114, 116. For example, after a large amount of data has been removed, performance improvements are provided by reducing the number of regions hosted by Region Server 122. While HBase architecture 100 supports offline merging of Regions 114, 116, for example, previous HBase implementations do not support online region merging.

Furthermore, previous methods of performing batch merges are slow because more than one script is used and do not copy data into a file to save time. Previous merging methods do not address how adjacency conditions are checked and how a list of regions is obtained. There is a lack of strategy, and longer manual methods are used to identify merge-able regions and no script exists to determine adjacent regions for performing the merges. Encoded region names are used, but table region names are difficult to obtain through previous used scripts. There is no test for region-oriented commands and no pattern is provided to merge empty zero-byte regions. Zero-byte regions include all column having values of 0, and are also referred to as empty regions. Thus, many manual steps are used to identify a lists of regions and precise region IDs are not identified. Normalization has been tried, but normalization is not sufficient to address online merging and identification of regions to be merged. Previous automatic merge causes issues and are not consistently executed which causes HBase to stay in a continual pending/rolled-back state. Efforts to provide a tool for merging relies on installation of additional software.

The previous merging methods are able to merge two adjacent regions as long as the cluster is not online. However, this presents problems because writes are not performed during the time a region is offline. To perform an offline merger, activities are stopped and the HBase architecture 100 is stopped. Even then, there is no concrete method to perform the merge operation. Previous methods involved manually reviewing tables and the logs, which is too much work. Thus, a manual merging process is performed and the HBase architecture 100 is able to be restarted. Stopping the HBase architecture 100 cause the teams using the HBase architecture 100 to be put on hold.

According to at least one embodiment, online merging and automatic merging of regions is provided. Small regions are able to be merged automatically. Online merging according to at least one embodiment is faster than manual methods and results in the user having to supply less manual input. An entire cluster is considered in one scripted process. Regions are able to be analyzed to find pairs to be merged, offline those regions, and merge them rather than disabling HBase.

Figure 2:
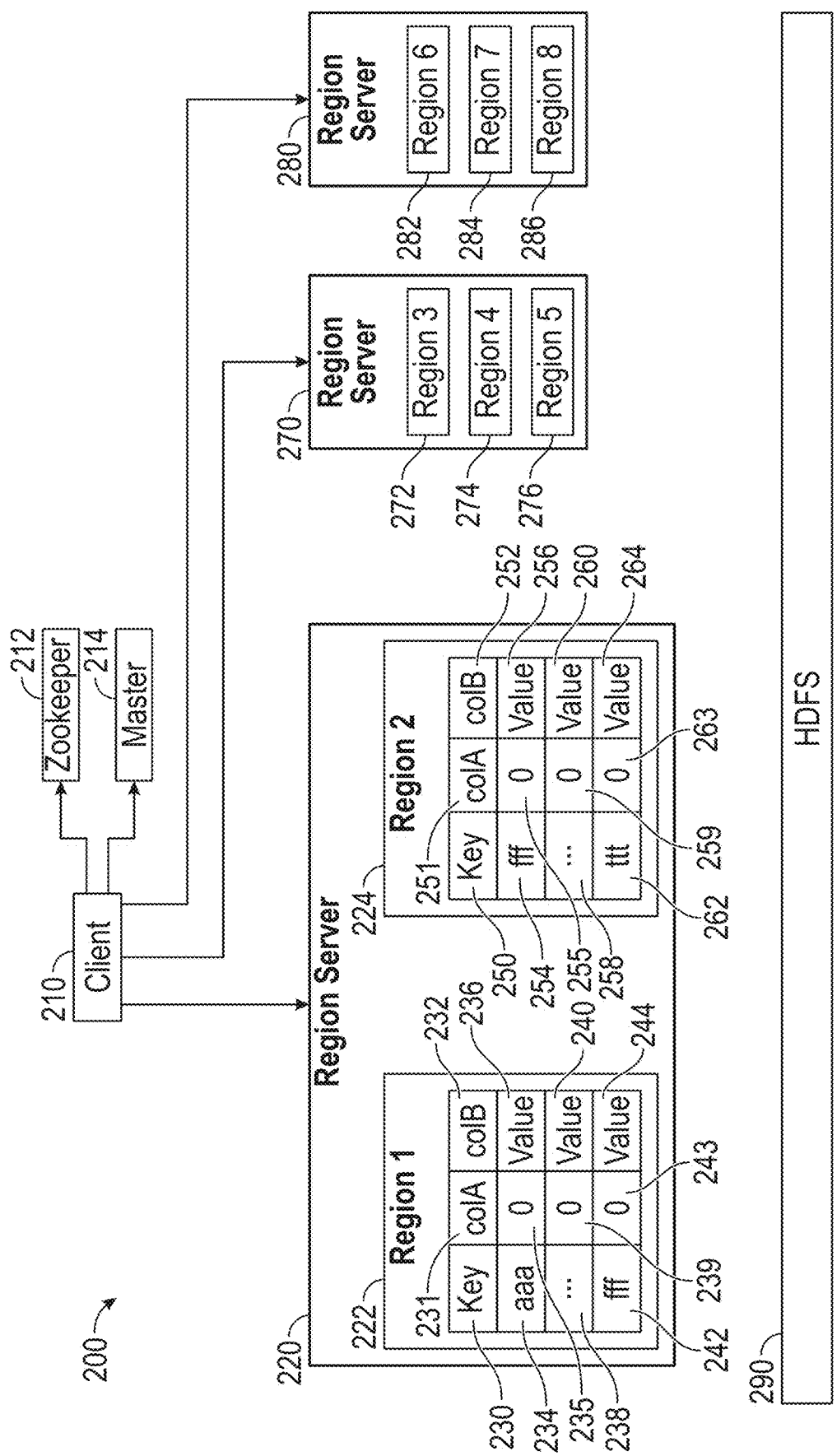
FIG. 2 illustrates an HBase system with a region having zero-byte values according to at least one embodiment.

FIG. 2 illustrates an HBase system with a region having zero-byte values 200 according to at least one embodiment.

In FIG. 2, Client 210 communicates in a bi-directional way with Zookeeper 212 and Master 214. Region Servers 220, 270, 280 receive writes and read requests from Client 210. Region Server 220 is shown having two regions, Region 1 222 and Region 2 224. Region 1 222 includes a table having a Key column 230, a column A (colA) 231, and a column B (colB) 232. The table begins with a key start address of "aaa" 234, a value of "0" 235 in colA 231, and a value of "value" 236 in colB 232. Intermediate key address is shown as "- - -" 238 with a value of "0" 239 in colA 231, and a value of "value" 240 in colB 232. The table in Region 1 222 has an end key address of "fff" 242, a value of "0" 243 in colA 231, and a value of "value" 244 in colB 232.

Region 2 224 includes a table having a Key column 250, a column A (colA) 251 and a column B (colB) 252. The table begins with a key start address of "fff" 254, a value of "0" 255 in colA 231, and a value of "value" 256 in colB 252. Intermediate key address is shown as "- - -" 258 with a value of "0" 259 in colA 251, and a value of "value" 260 in colB 252. The table in Region 2 224 has an end key address of "ttt" 262, a value of "0" 263 in colA 251, and a value of "value" 264 in colB 252. Region Server 270 is shown with Region 3 272, Region 4 274, and Region 5 276. Region Server 280 is shown with Region 6 282, Region 7 284, and Region 8 286.

In HBase, Master 214 maintains nodes in a cluster. Master 214 provides administration performance information and distributes services to different region servers. Master 214 also assigns Region 1 222 and Region 2 224 to Region Server 220. Master assigns Region 3 272, Region 4 274, and Region 5 276 to Region Server 270, and assigns Region 6 282, Region 7 284, and Region 8 286 to Region Server 280. Data for Region Server 220, Region Server 270, and Region Server 280 is maintained using the Hadoop Distributed File System (HDFS) 290.

Master 214 includes features for controlling load balancing and failover to manage the load over nodes present in the cluster. In response to Client 210 wanting to change any schema and to change any metadata operations, Master 214 takes responsibility for these operations. For read and write operations, Master 214 directly contacts with Region Servers 220, 270, 280 and is able to check the health status of Region Servers 220, 270, 280. Regions 220, 270, 280 include a subset of a table's data.

Zookeeper 212 is a centralized monitoring server which maintains configuration information and provides distributed synchronization. Distributed synchronization provides access by the distributed applications running across the cluster with the responsibility of providing coordination services between nodes. Client 210 communicates with Zookeeper 212 to communicate with Regions 222, 224, 272, 274, 276, 282, 284, 286. Services provided by Zookeeper 212 also include tracking server failure and network partitions.

As described above, Regions 222, 224 include column entries/values of zero 235, 239, 243, and column entries/values of zero 255, 259, 263, respectively. Herein, zero-byte regions refer to column entries having values of 0, and are also referred to as empty regions. Regions 222 has start key "aaa" 234 and stop key "fff" 242. Start key "fff" 254 of Region 224 is immediately adjacent to stop key "fff" 242 of Region 222. The presence of zero-byte regions 235, 239, 243, and zero-byte regions 255, 259, 263 make those regions heavily loaded and unstable, and obstructs rewrite request in Region 1 222 and Region 2 224. To solve these problems, HBase allows offline manual merging operations. Embodiments described herein below provide online merging and automatic merging of regions.

Figure 3:
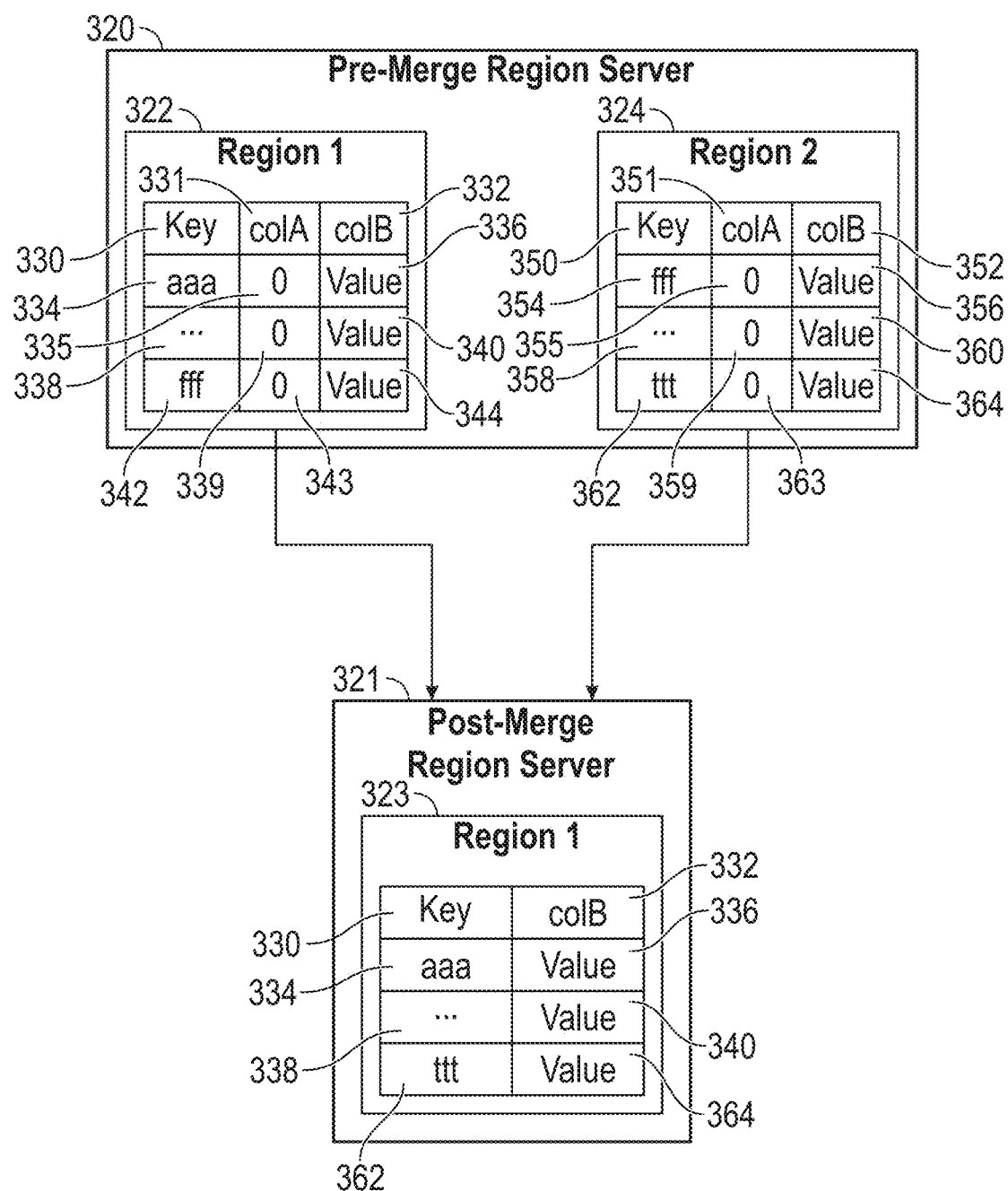
FIG. 3 illustrates an example of a merge operation according to at least one embodiment.

FIG. 3 illustrates an example of a merge operation 300 according to at least one embodiment.

In FIG. 3, Pre-Merger Region Server 320 is shown having two regions, Region 1 322 and Region 2 324. Region 1 322 includes a table having a Key column 330, a column A (colA) 331, and a column B (colB) 332. The table begins with a key start address of "aaa" 334, a value of "0" 335 in colA 331, and a value of "value" 336 in colB 332. Intermediate key address is shown as "- - -" 338 with a value of "0" 339 in colA 331, and a value of "value" 340 in colB 332. The table in Region 1 322 has an end key address of "fff" 342, a value of "0" 343 in colA 331, and a value of "value" 344 in colB 332.

Region 2 324 includes a table having a Key column 350, a column A (colA) 351 and a column B (colB) 352. The table begins with a key start address of "fff" 354, a value of "0" 355 in colA 331, and a value of "value" 356 in colB 352. Intermediate key address is shown as "- - -" 358 with a value of "0" 359 in colA 351, and a value of "value" 360 in colB 352. The table in Region 2 324 has an end key address of "ttt" 362, a value of "0" 363 in colA 351, and a value of "value" 364 in colB 352.

Region 2 324 is adjacent to Region 1 322 with start key 350 of "fff" 354 immediately adjacent to end key of "fff" 342 of Region 1 322. Post-Merge Region Server 321 shows colA 331 of Region 1 and colA 351 of Region 2 324 has been removed in new Post-Merge Region 1 323. Post-Merge Region Server 321 shows new Post-Merge Region 1 323 with start key of "aaa" 330, intermediate key of "- - -" 338, and end key of "ttt" 362. ColB 332 is maintained with a value of "value" 336 in colB 332, a value of "value" 340 in colB 332, and a value of "value" 364 in colB 332, The merge operation shown in FIG. 3 is provided as a simple example and is not meant to limit embodiments described herein. Embodiments described herein below provide online merging and automatic merging of regions.

Figure 4:
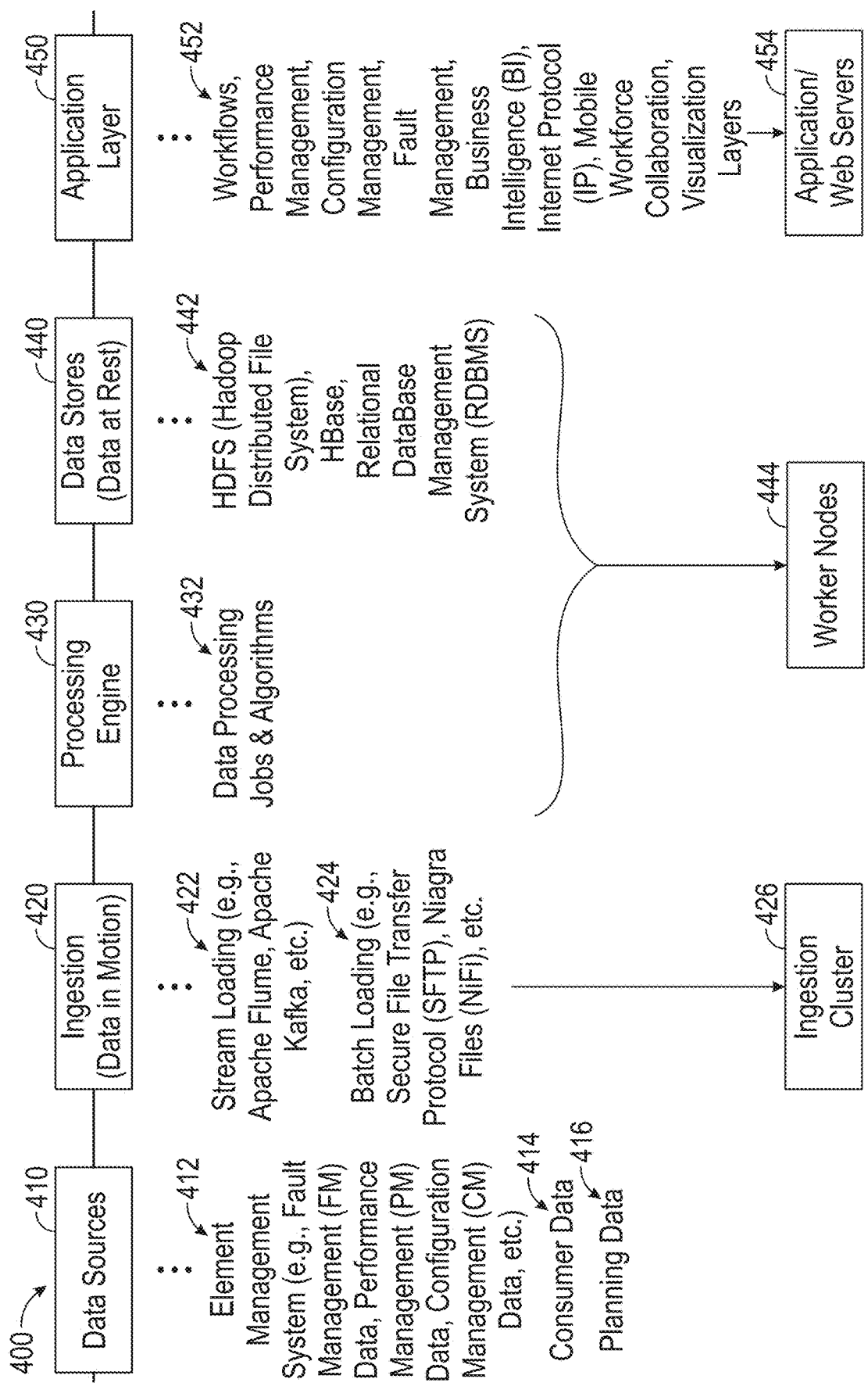
FIG. 4 illustrates system flow in an Operations Support Systems (OSS) according to at least one embodiment.

FIG. 4 illustrates system flow in an Operations Support Systems (OSS) 400 according to at least one embodiment.

In FIG. 4, Data Sources 410 are the sources of 4G/LTE or 5G/NR data as well as mobile core network elements data. Data Sources 410 of 4G/LTE or 5G/NR data include eNodeBs (LTE), gNodeBs (NR) and mobility management entities (MMEs). Other data sources are available depending on the architecture. As part of Data Sources 410, an Element Management System (EMS) 412 manages specific types of network elements. The EMS within a network element is used to manage functions and capabilities of the network element. Data Sources 410 also include Consumer Data 414 and Planning Data 416.

Ingestion 420 involves the transfer of data from Data Sources 410 to Ingestion Cluster 426. Ingestion Cluster 426 is configured as one or more servers. Ingestion 420 loads data through Stream Loading 422 or Batch Loading 424. In Stream Loading 422 the data is ingested into applications as soon as it is generated. Stream Loading 422 of data is used in cases where the goal is to provide insights as fast as possible. Stream Loading 422 involves loading data as-is (without manipulation). In Batch Loading 424, data is provided to queues at regularly scheduled intervals, where the data is then loaded into applications. Batch Loading 424 is useful for obtaining data from processes that run on a schedule, such as reports that run daily at a specific time.

Processing Engine 430 is used to analyze data from Ingestion 420. Processing Engine 430 applies Data Processing Jobs and Algorithms 432 to the data. Processing Engine 430 uses the Data Processing Jobs and Algorithms 432 to organize, configure, and partition the data.

Data Stores 440 provide persistent storage and management for collections of data that include repositories such as databases and files. Different datastores are able to be used, such as Hadoop Distributed File System (HDFS), HBase, and Relational DataBase Management System (RDBMS) 442. HDFS is a distributed, scalable, and portable file system used by Hadoop applications to manage large amounts of data and support related big data analytics applications. Big data refers to a combination of structured, semi-structured and unstructured data that is ingested and that is able to be mined for information, used in machine learning projects, predictive modeling and other advanced analytics applications. HBase is the Hadoop database that provides a distributed, scalable, big data store. HBase is a column-oriented non-relational database management system that runs on top of HDFS. RDBMS stores data in a row-based table structure that connects related data elements.

Processing Engine 430 and Data Stores 440 are supported by Worker Nodes 444. Worker Nodes 444 are used to run applications and handle networking to ensure that traffic between applications are properly facilitated. Worker Nodes 444 are able to be implemented as a virtual machine, a physical machine, or a combination.

Application Layer 450 provides various kinds of services, including User Management, Index Management, and Resource Management. Application Layer 450 is configured to provide application services to support WorkFlows, Performance Management, Configuration Management, Fault Management, Business Intelligence (BI), Internet Protocol (IP), Mobile Workforce Collaboration, and Visualization Layers 452. Application Layer 450 is implemented using Application/Web Servers 454.

While HBase 442 supports offline merging of regions, previous HBase implementations do not support online region merging. Thus, two adjacent regions are able to be merged as long as the cluster supporting Data Stores 440 is not online. However, this presents problems because writes are not performed during the time a region is offline. To perform an offline merger, activities are stopped and HBase 442 is stopped. Then, the merging process is performed and HBase 442 is able to be restarted. Stopping HBase 442 causes teams using HBase 442 to be put on hold. Online merging and automatic merging of regions according to embodiments described herein are provided for HBase 442.

FIG. 5 illustrates Regions List User Interface (UI) 500 according to at least one embodiment.

In FIG. 5, UI 500 identifies regions according to a Name 510 of a region, a Region Server 512, a number of Read Requests 514, a number of Write Requests 516, s Store File Size 518, a Number of Store Files 520, a Memory Size 522, a Locality 524, a Start Key 526, and an End Key 528. A first region 530 has Name 510 of "123456.ax123by978" 532. Region 530 is on Region Server 512 identified as "hdp-worker-node—001" 534. Region 530 has a number of Read Requests 514 identified as "0" 536, a number of Write Requests 516 identified as "8,010" 538, a Store File Size 518 of 4 MB 540, a Number of Store Files 520 of "1" 542, and a Memory Size 522 of "0" 544. Region 530 does not show a Start Key 526, but has an End Key 528 of "123456789" 546.

A second region 550 has Name 510 identified as being "234567.bx456cy654" 552 and is on Region Server 512 identified as "hdp-worker-node—002" 554. Region 550 has a number of Read Requests 514 identified as "0" 556, a number of Write Requests 516 identified as "0" 558, a Store File Size 518 of "0" 560, a Number of Store Files 520 of "0" 562, and a Memory Size 522 of "0" 564. Region 550 show a Start Key 526 of "123456789" 566, which is the same as End Key 528 of "1256789" 546 of Region 530. Region 550 has an End Key 528 of "123457999" 566. Because Start Key 566 of Region 550 is the same as End Key 546 of Region 530, Region 550 is an adjacent region to Region 530.

Region 570 is shown as being on Region Server 512 of "hdp-worker-node—003" 572. Region 570 has a Memory Size of "0" 574. Region 570 has a Start Key 526 of "123457999" 576 and an End Key 528 of "123459999" 578. Because Start Key 576 of Region 570 is the same as End Key 568 of Region 550, Region 570 is an adjacent region to Region 550.

Region 580 is shown as being on Region Server 512 of "hdp-worker-node—004" 582. Region 580 has a Memory Size of "0" 584. Region 580 has a Start Key 526 of "123459999" 586 and an End Key 528 of "123462456" 588.

Because Start Key 586 of Region 580 is the same as End Key 578 of Region 570, Region 580 is an adjacent region to Region 570.

Region 590 is shown as being on Region Server 512 of "hdp-worker-node—005" 592. Region 590 has a Memory Size of "0" 594. Region 590 has a Start Key 526 of "123462456" 596 and an End Key 528 of "123474699" 598. Because Start Key 596 of Region 590 is the same as End Key 588 of Region 580, Region 590 is an adjacent region to Region 580.

Online merging and automatic merging of regions according to at least one embodiment described herein is able to be performed to merge Region 550 with Region 530 to eliminate the zero-byte regions of Region 550.

Online merging on, for example, Regions 530, 550, 570, 580, 590 is performed. The merge is able to be initiated manually through a command line (e.g., the HBase shell). In at least one alternative embodiment, the merge is initiated via an automated process that does not rely on user selection and action. The Online merging and automatic merging of regions according to embodiments described herein is also able to automatically repeat the online merging with Region 570, Region 580, and Region 590 to remove the zero-byte regions.

Figure 6:
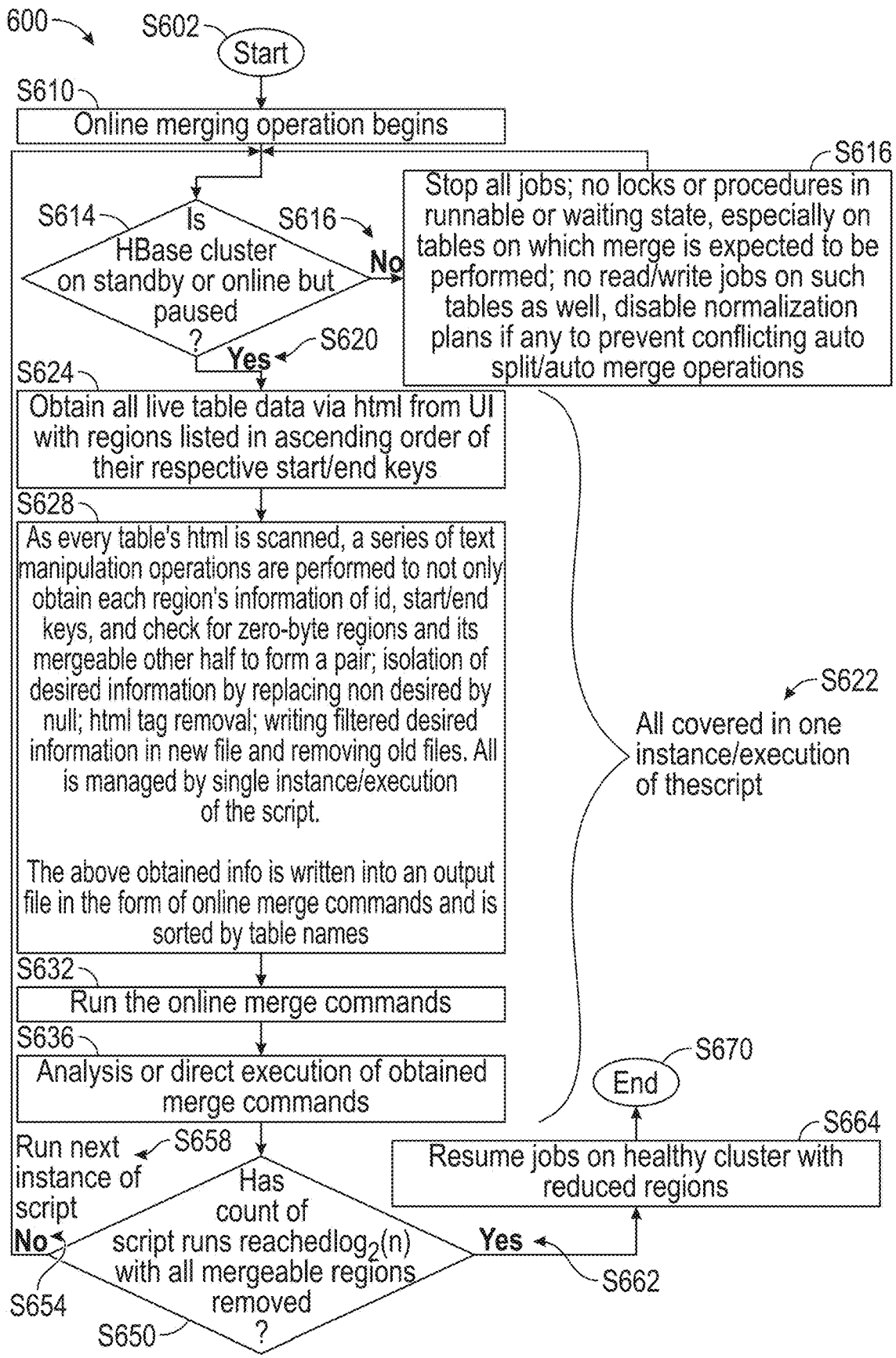
FIG. 6 is a flowchart of a method for performing online merging of regions according to at least one embodiment.

FIG. 6 is a flowchart 600 of a method for performing online merging of regions according to at least one embodiment.

In FIG. 6, the online merging process begins S602 and the online merging operation begins S610. The merge is able to be initiated manually through a command line (e.g., the HBase shell). In at least one alternative embodiment, the merge is initiated via an automated process that does not rely on user selection and action.

A determination is made whether the HBase cluster is in standby mode, or whether the HBase cluster is online but paused S614. Thus, the regions are in standby, which is different from being offline. The HBase service is not halted.

Determination S614 is performed so that merge in bulk can be performed without jobs triggering internal merging that HBase performs on, e.g., a table being created, data being written or imported and so that there is no form of job conflict that exists.

In response to the HBase cluster not being in standby mode or being online but not paused S616, checks are performed S618. For example, all jobs are stopped. Jobs that interact (read/write) with HBase active and issue free HBase master node are stopped so that there are no internet/networking issues. There are no locks or procedures in runnable or waiting state, e.g., Regions In Transition (RIT), especially on tables on which merge is expected to be performed. There are no read/write jobs on such tables. Normalization plans (if any) are disabled to prevent conflicting auto split/auto merge operations.

In response to the HBase cluster being in standby mode or being online but paused S620, a script for performing online merge is created and run S622. A script can be specific for a cluster, for other environments, to make changes, to push the execution of the script to a log file. At this point, tables displayed in the UI for performing a merge are accessible. FIG. 5 shows adjacent regions that are candidates for online merging according to at least one embodiment.

To perform online merging according to at least one embodiment, the script obtains live table data via HyperText Markup Language (HTML) from UI with regions listed in ascending order of their respective start/end keys S624. For example, table names are stored in an array or can be fed from a file.

A table's HTML is scanned to obtain information for performing the online merge S628. Text-based manipulations are performed. Based on a pattern regions that include zero-byte regions and satisfy the adjacency check are identified. The adjacency check identifies regions where an end key of a first region is the same as the start key of a subsequent region. Previously, this was manually checked. In at least one embodiment, the two regions are automatically checked to determine the end key of the first region is identified as the same as the start key of the second region. Thus, the script extracts all merge-able candidates from HTML that fulfill adjacency condition. Key pairs for the zero-byte regions are isolated by removing HTML tags. The information is filtered and written in a new file and old files are removed. The written output file is in the form of online merge commands and is sorted by table names Merge commands that are obtained are bunched with respective table name headings and then executed. In at least one embodiment, the merge commands are executed from the HBase shell (command line). Thus, the cluster is analyzed to identify merge pairs on the tables. In response to finding zero-byte regions that are to be merged, the region is identified and appended in a text file. Tables in a cluster to be merged are identified in response to the script being run.

The online merge commands are executed S632 and the obtained merge commands are analyzed or are executed S636.

A determination is made whether the count of script runs has reached $\log_2$ (n) with all mergeable regions removed S650. The count may not be a strict check since number of times script has to be run will depend on how the zero-byte regions are distributed across tables. The number of times the script is run depends on how the zero-byte regions are distributed across tables. In response to "n" regions in the cluster (or in some tables of the cluster) are zero-byte and consecutive, the script is run log 2(n) times and the zero-byte regions are removed. All non-consecutive qualifying zero-byte regions are able to be removed with one instance of running the script. In response to one zero-byte merging with a second zero-byte region, then one zero-byte region will result, wherein the resulting zero-byte region is able to merge with another zero-byte or non-zero-byte region in the script's next instance. For example, in response to there being 10 zero-byte qualifying regions in 10 different tables (e.g., one zero-byte region in each table), then one script execution takes care of them all. However, in response to the zero-byte regions all being in one table (and are consecutive), then half will remain unpaired in first execution of the script. Thus, order of log 2(n) times in the worst case scenario for a table to remove all of the zero-byte regions. The average time complexity is a complex calculation. Nevertheless, compared to previous methods, the HBase online merge according to at least one embodiment is a faster and complete solution for merging zero-byte regions in an online HBase cluster. The time cost is able to be further reduced based on additional work and conditions to examine the distribution of zero byte regions. In response to there being no mergeable regions present, then the output will be blank, which is able to be viewed from the UI.

In response to the count of scripts that have been run not reaching $\log_2$ (n) and mergeable zero-byte regions remain S654, the next instance of the script is run S658. Thus, in response to there being additional zero-byte regions, the script is rerun to remove further zero-byte regions.

In response to the count of scripts that have been run reaching $\log_2$ (n) and all mergeable zero-byte regions removed S662, jobs on the healthy cluster with reduced regions are resumed S664. Thus, the zero-byte regions have been removed, and the cluster is able to perform more efficiently due to the removal of the zero-byte regions.

The process then terminates S670.

User, e.g., development engineers and backend developers, monitor the cluster health via a user interface (UI). The users perform routine monitoring, and certain alerts setup. Developers are informed about any anomaly related to HBase queries. Users share error logs, which provide information about region related issues, such as slow reads/writes which suggest issues with cluster health. In at least one embodiment, merging is performed in response to the number of regions determined to be high (e.g., past a predetermined threshold) with many zero-byte regions in the tables.

Candidate regions are identified based on zero-byte regions, error logs, abnormal performance characteristics. In at least one embodiment, the zero-byte regions are automatically identified and removed in response to triggering the merge. The merge is able to be initiated manually through a command line (e.g., the HBase shell). In at least one embodiment, the merge is initiated via an automated process that does not rely on user selection and action. The cluster of the HBase database is checked to ensure the cluster is in standby mode or is online and paused. Regions in the cluster that are zero-byte regions and that are adjacent are identified as candidates for an online merge operation. Adjacent zero-byte regions include a first region having an end key value equal to a start key value of a subsequent region. A script is created for performing the online merge operation on the regions in the cluster. The script is run on the regions until there are no more zero-byte regions in the cluster. Jobs on the cluster of the HBase database are resumed after performing the online merging operations.

Results of the online margining operation are reflected on the UI when the region information is refreshed (e.g., the zero-byte regions disappear from the region presentation on the UI. No data is lost. Alarms will also stop as their notification mail will change status from ALERT to OK. Regions presented in the UI are able to be further inspected to decide whether to perform more merging. Errors are also observed to stop occurring and the system exhibits acceptable performance.

Figure 7:
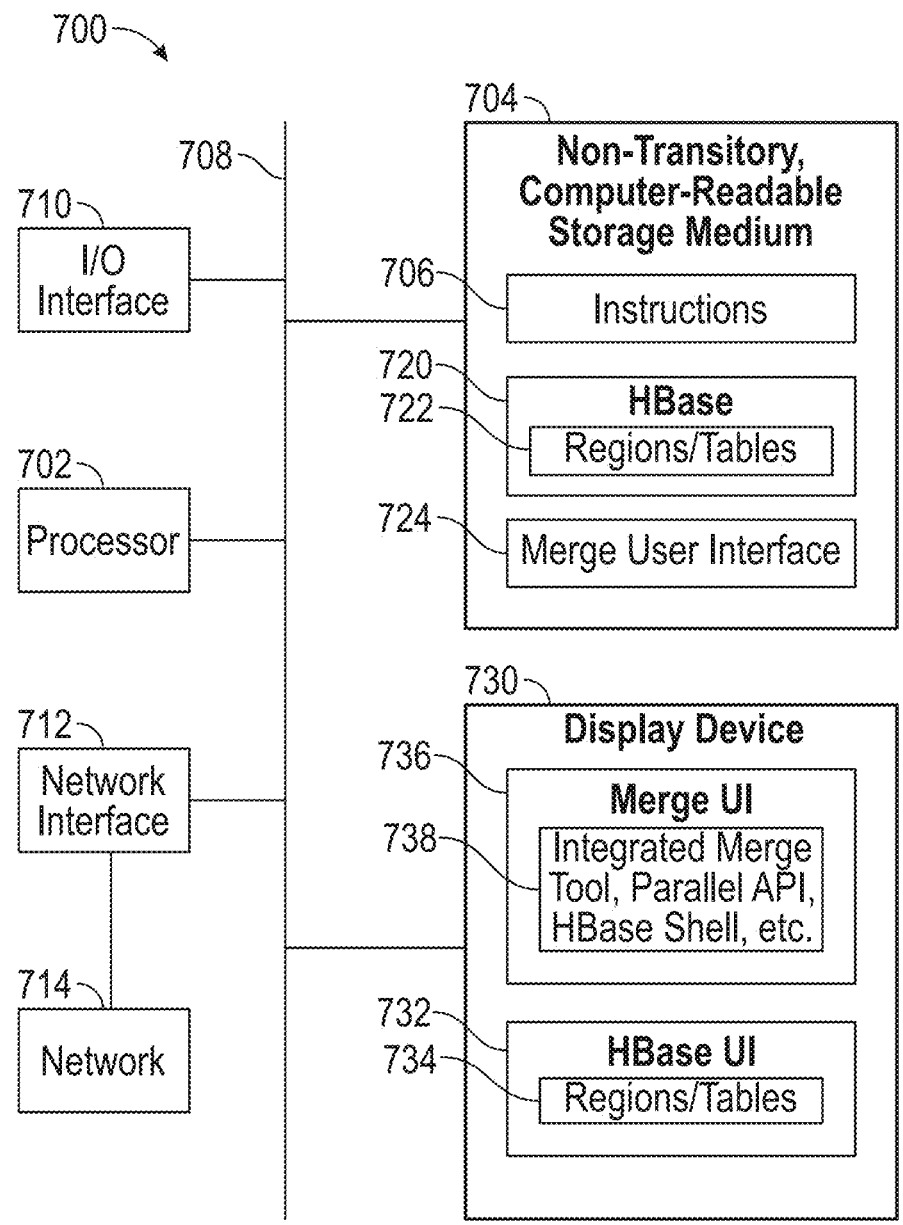
FIG. 7 is a high-level functional block diagram of a processor-based system according to at least one embodiment.

FIG. 7 is a high-level functional block diagram of a processor-based system 700 according to at least one embodiment.

In at least one embodiment, processing circuitry 700 implements online merging according to at least one embodiment. Processing circuitry 700 implements online merging according to at least one embodiment using processor 702. Processing circuitry 500 also includes a non-transitory, computer-readable storage medium 704 that is used to implement online merging according to at least one embodiment. Storage medium 704, amongst other things, is encoded with, i.e., stores, instructions 706, i.e., computer program code that are executed by processor 702 causes processor 702 to perform operations online merging according to at least one embodiment. Execution of instructions 706 by processor 702 represents (at least in part) an application which implements at least a portion of the methods described herein in accordance with one or more embodiments (hereinafter, the noted processes and/or methods).

In one or more embodiments, one or more non-transitory computer-readable storage media 704 having stored thereon instructions (in compressed or uncompressed form) that may be used to program a computer, processor, or other electronic device) to perform processes or methods described herein. The one or more non-transitory computer-readable storage media 704 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 704 includes a Compact Disk-Read Only Memory (CD-ROM), a Compact Disk-Read/Write (CD-R/W), and/or a Digital Video Disc (DVD).

Computer-readable storage medium 704 maintains HBase 720 including Regions/Tables 722. While HBase 720 including Regions/Tables 722 is shown as being maintained on Computer-Readable Storage Medium 704 of processor-based system 700, those skilled in the art recognize that Computer-Readable Storage Medium 704 is also capable of being implemented over many devices in a distributed manner because HBase 720 is a Hadoop database that is implemented using a network of many computers/servers.

Computer-readable storage medium 704 also maintains instructions for a Merge User Interface (UI) 724. Processor 702 is electrically coupled to computer-readable storage medium 704 via a bus 708. Processor 702 is electrically coupled to an Input/output (I/O) interface 710 by bus 708. A network interface 712 is also electrically connected to processor 702 via bus 708. Network interface 712 is connected to a network 714, so that processor 702 and computer-readable storage medium 704 connect to external elements via network 714. Processor 702 is configured to execute instructions 706 encoded in computer-readable storage medium 704 to cause processing circuitry 700 to be usable for performing at least a portion of the processes and/or methods. In one or more embodiments, processor 702 is a Central Processing Unit (CPU), a multi-processor, a distributed processing system, an Application Specific Integrated Circuit (ASIC), and/or a suitable processing unit.

Processing circuitry 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

Processing circuitry 700 also includes network interface 712 coupled to processor 702. Network interface 712 allows processing circuitry 700 to communicate with network 714, to which one or more other computer systems are connected. Network interface 712 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 700 is configured to receive information through I/O interface 710. The information received through I/O interface 710 includes one or more of instructions, data, design rules, libraries of cells, and/or other parameters for processing by processor 702. The information is transferred to processor 702 via bus 708. Processor 702 is configured to receive information through I/O interface 710 to present HBase UI 732 on Display Device 730. HBase UI 732 is able to display information about the HBase 720 including Regions/Tables 734. For example, HBase UI 732 is able to display Regions List User Interface (UI) 500 as described with reference to FIG. 5. Processor 702 is also configured to receive information through I/O interface 710 to present Merge UI 736 on Display Device 730 that enables a user to execute the online merge and to visualize information in support of the online merge.

In response to a user wanting to make a change to the HBase tables, a user request generation of a change request ticket to present to the leads and management team. Once the ticket is approved, then the user is able to cause processor 702 to execute the online merge via Merge UI 736 according to at least one embodiment. However, a merge is able to be performed without invoking a ticket because impacted regions are put in standby or paused. The processor 702 is able to perform the merge without the user worrying about the impact to the region. For example, in response to a merge or split being performed on its own through normalization, the merge is not performed because the processor does not have access to the region. A job cannot be writing data to the region. Once the merge is selected via Merge UI 736, a script will access the URL and table data of HBase 720 and regions to be merged are obtained via HTML from the Merge UI 736. Merge UI 736 lists the regions in ascending order of their respective start and end keys. and a curl request is sent from Merge UI 736 to transfer data. The curl request enables the user to determine information to use from an URL. The merge process iterates over the tables and the start and end keys are ordered so that the adjacency condition is achieved.

According to at least one embodiment, zero-byte regions are merged or zero-byte regions are merged with non-zero-byte regions. The user is able to reduce regions by performing a merge based on a plurality of predetermined strategies, including targeting zero-byte regions, as long as adjacency condition is fulfilled. The adjacency condition is met by the end key of the first region being the same as the start of the next region. For example, small size regions are able to be merged where there can be condition to check entries for the size column obtained in table's HTML information.

From Merge UI 736, regions/tables identified as benefiting from merging are able to be selected, wherein an entire cluster is not taken offline but regions on selected tables to be merged are in an idle state, e.g., standby mode or is online and paused. The idle state refers to regions in the cluster that are to be merged having no jobs (applications) running, i.e., no processing or read/write is being executed on the HBase tables/regions during the merge operation. Accordingly, selected target tables for the merge are stopped, and the other tables/regions function as usual. So, the HBase service remains online and read/writes are able to be performed on the tables that are not subject to the merge. Thus, regions/tables are able to be selected via Merge UI 736 to perform merging without performing a merge on an entire cluster.

Merge UI 736 and associated merge operations are able to be integrated with a merge tool, a parallel Application Programming Interface (API), or a HBase shell (e.g., with command line interfacing). Merge UI 736 and associated merge operations are able to be implemented via an HBase native command or a flag to trigger merging. For example, in at least one embodiment, Merge UI 736 enables a user to select table names provided in an array, and perform a merge on those tables.

In one or more embodiments, storage medium 704 stores computer program code 706 configured to cause processing circuitry 700 to perform at least a portion of the processes and/or methods for performing online merging. In one or more embodiments, storage medium 704 also stores information, such as algorithm which facilitates performing at least a portion of the processes and/or methods for performing online merging. Accordingly, in at least one embodiment, the processor circuitry 700 executes a method for performing online merging. The process includes presenting, in a user interface (UI) presented on a display, regions in a cluster of an HBase database, receiving input to initiate an online merging operation, determining the cluster of the HBase database is available for performing the online merging operation, identifying regions in the cluster that are candidate regions for performing the online merging operation, creating a script for performing the online merging operation on the candidate regions in the cluster, and running the script on the candidate regions in the cluster to perform the online merging operation.

The method for performing online merging according to at least one embodiment provides at least the advantages of providing online merging and automatic merging of regions. Small regions are able to be merged automatically. Online merging according to at least one embodiment is faster than manual methods and results in the user having to supply less manual input. An entire cluster is considered in one scripted process. Regions are able to be analyzed to find pairs to be merged, offline those regions, and merge them rather than taking the cluster offline, e.g., stopping the HBase service. In response to there being extra regions or too many regions and performance is able to be improved by execution of a merge, the merge processes is performed.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for performing online merging of regions in an HBase database, comprising:
    identifying adjacent regions in a cluster as being candidate regions for performing an online merging operation;
    determining which of the adjacent regions in the cluster as being candidate regions are in idle state;
    creating a script for performing the online merging operation on the adjacent regions in the idle state in the cluster as being candidate regions; and
    merging the adjacent regions in the idle state in the cluster as being candidate regions by running the script, wherein operation of the adjacent regions other than the adjacent regions in the idle state is maintained during the running of the script.

2. The method of claim 1, wherein the identifying the adjacent regions in the cluster as being candidate regions for running the script further comprises receiving input to initiate the running the script to merge the adjacent regions, and determining the cluster of the HBase database is available for performing the running the script.

3. The method of claim 1, wherein the identifying the adjacent regions in the cluster as being candidate regions for running the script includes determining the candidate regions in the cluster of the HBase database are in standby mode or is online and paused.

4. The method of claim 1, wherein the identifying adjacent regions as being candidate regions for the running the script includes identifying zero-byte regions in the cluster that are adjacent.

5. The method of claim 4, wherein the identifying the zero-byte regions in the cluster that are adjacent includes identifying a first region having an end key value equal to a start key value of a subsequent region, wherein at least one of the first region and the subsequent region is a zero-byte region.

6. The method of claim 1, wherein the running the script to merge the adjacent regions in the cluster as being candidate regions further includes:
determining whether zero-byte regions remain in the cluster after running the script; and
in response to zero-byte regions remaining in the cluster, re-running the script until all zero-byte regions are removed.

7. The method of claim 1, wherein the creating the script for merging the adjacent regions in the cluster as being candidate regions includes:
obtaining table data of the adjacent regions via HyperText Markup Language (HTML) and listing the adjacent regions listed in ascending order of start keys and end keys;
performing text manipulation operations on the adjacent regions to obtain region information including identification, start key, and end key;
identifying zero-byte regions from the adjacent regions;
determining mergeable pairs of the adjacent regions based on the identifying the zero-byte regions;
isolating the mergeable pairs of adjacent regions by removing HTML tags; and
writing region information for the mergeable pairs of adjacent regions in a file as online merge commands to create the script.

8. A device for performing online merging, comprising:
a memory storing computer-readable instructions; and
a processor connected to the memory, wherein the processor is configured to execute the computer-readable instructions to:
identify adjacent regions in a cluster as being candidate regions for performing an online merging operation;
determine which of the adjacent regions in the cluster as being candidate regions are in idle state;
create a script for performing the online merging operation on the adjacent regions in the idle state in the cluster as being candidate regions; and
merge the adjacent regions in the idle state in the cluster as being candidate regions by running the script, wherein operation of the adjacent regions other than the adjacent regions in the idle state is maintained during the running of the script.

9. The device of claim 8, wherein the processor is further configured to receive input to initiate the running the script to merge the adjacent regions, and determine the cluster of the HBase database is available for performing the running the script to merge the adjacent regions.

10. The device of claim 8, wherein the processor is configured to identify the adjacent regions in the cluster as being candidate regions for the running the script to merge the adjacent regions by determining the candidate regions in the cluster of the HBase database are in standby mode or is online and paused.

11. The device of claim 8, wherein the processor is configured to identify adjacent regions as being candidate regions for the running the script to merge the adjacent regions by identifying zero-byte regions in the cluster that are adjacent.

12. The device of claim 11, wherein the processor is configured to identify zero-byte regions in the cluster that are adjacent by identifying a first region having an end key value equal to a start key value of a subsequent region, wherein at least one of the first region and the subsequent region is a zero-byte region.

13. The device of claim 8, wherein the processor is further configured to determine whether zero-byte regions remain in the cluster after running the script and, in response to zero-byte regions remaining in the cluster, re-running the script until all zero-byte regions are removed.

14. The device of claim 8, wherein the processor is configured to create the script for running the script to merge the adjacent regions in the cluster as being candidate regions by:
obtaining table data of the adjacent regions via HyperText Markup Language (HTML) and listing the adjacent regions listed in ascending order of start keys and end keys;
performing text manipulation operations on the adjacent regions to obtain region information including identification, start key, and end key;
identifying zero-byte regions from the adjacent regions;
determining mergeable pairs of the adjacent regions based on the identifying the zero-byte regions;
isolating the mergeable pairs of adjacent regions by removing HTML tags; and
writing region information for the mergeable pairs of adjacent regions in a file as online merge commands to create the script.

15. A non-transitory computer-readable media having computer-readable instructions stored thereon, which when executed by a processor causes the processor to perform operations comprising:
identifying adjacent regions in a cluster as being candidate regions for performing an online merging operation;
determining which of the adjacent regions in the cluster as being candidate regions are in idle state;
creating a script for performing the online merging operation on the adjacent regions in the idle state in the cluster as being candidate regions; and
merging the adjacent regions in the idle state in the cluster as being candidate regions by running the script, wherein operation of the adjacent regions other than the adjacent regions in the idle state is maintained during the running of the script.

16. The non-transitory computer-readable media of claim 15 further comprises receiving input to initiate the running the script to merge the adjacent regions, and determining the cluster of the HBase database is available for running the script to merge the adjacent regions.

17. The non-transitory computer-readable media of claim 15, wherein the identifying the adjacent regions in the cluster that are in an idle state as being candidate regions for running the script to merge the adjacent regions includes determining the candidate regions in the cluster of the HBase database are in standby mode or are online and paused.

18. The non-transitory computer-readable media of claim 15,
wherein the identifying the adjacent regions in the cluster as being candidate regions for the running the script to merge the adjacent regions includes identifying zero-byte regions in the cluster that are adjacent regions, wherein the identifying the zero-byte regions in the cluster that are adjacent regions includes identifying a first region having an end key value equal to a start key value of a subsequent region, wherein at least one of the first region and the subsequent region is a zero-byte region.

19. The non-transitory computer-readable media of claim 15, wherein the running the script on the adjacent regions in the cluster as being candidate regions further includes:
determining whether zero-byte regions remain in the cluster after running the script; and
in response to zero-byte regions remaining in the cluster, re-running the script until all zero-byte regions are removed.

20. The non-transitory computer-readable media of claim 15, wherein the creating the script for running the script to merge the adjacent regions in the cluster as being candidate regions includes:
obtaining table data of the adjacent regions via HyperText Markup Language (HTML) and listing the adjacent regions listed in ascending order of start keys and end keys;
performing text manipulation operations on the adjacent regions to obtain region information including identification, start key, and end key;
identifying zero-byte regions from the adjacent regions;
determining mergeable pairs of the adjacent regions based on the identifying the zero-byte regions;
isolating the mergeable pairs of adjacent regions by removing HTML tags; and
writing region information for the mergeable pairs of adjacent regions in a file as online merge commands to create the script.

* * * * *